(12) United States Patent
Lynner

(10) Patent No.: US 11,986,912 B1
(45) Date of Patent: May 21, 2024

(54) SYSTEM FOR MATERIAL DEPOSITION ON A SURFACE

(71) Applicant: Carman James Lynner, Sioux City, IA (US)

(72) Inventor: Carman James Lynner, Sioux City, IA (US)

(73) Assignee: Rocklin Manufacturing Company, Sioux City, IA (US)

( * ) Notice: Subject to any disclaimer, the term of this patent is extended or adjusted under 35 U.S.C. 154(b) by 738 days.

(21) Appl. No.: 17/153,986

(22) Filed: Jan. 21, 2021

(51) Int. Cl.
*B23K 9/10* (2006.01)
*B23K 9/04* (2006.01)

(52) U.S. Cl.
CPC ............ *B23K 9/1075* (2013.01); *B23K 9/042* (2013.01)

(58) Field of Classification Search
CPC .............................. B23K 9/042; B23K 9/1075
USPC ......................................................... 219/76.1
See application file for complete search history.

(56) References Cited

U.S. PATENT DOCUMENTS

| | | | |
|---|---|---|---|
| 3,524,956 A | 8/1970 | Rocklin | |
| 3,763,343 A | 10/1973 | Rocklin | |
| 3,878,351 A | 4/1975 | Rocklin | |
| 3,969,601 A | 7/1976 | Rocklin | |
| 4,551,603 A | 11/1985 | Rocklin | |
| 4,582,979 A * | 4/1986 | Moerke | B23K 9/295 219/137.9 |
| 8,674,262 B2 * | 3/2014 | Soma Raju | H03K 3/017 219/76.1 |
| 10,864,592 B2 * | 12/2020 | Ulrich | B23K 9/1006 |

* cited by examiner

*Primary Examiner* — Dana Ross
*Assistant Examiner* — James F Sims, III
(74) *Attorney, Agent, or Firm* — Jeffrey A. Proehl; Woods, Fuller, Shultz & Smith, PC

(57) ABSTRACT

A system for depositing a material on a workpiece may include a tool unit to support an electrode and having an electrode supporting element and movement structure configured to move the electrode via the supporting element. The system may include electrical circuitry to produce a voltage potential between the electrode and the surface. The electrical circuitry may have a power source to provide power to elements of the circuitry, and a bank of capacitors configured to be selectively charged by the power source and discharged via an electrode engaged by the electrode supporting element to the surface. In embodiments, the power source may comprise a rechargeable battery. In embodiments, the electrical circuitry may include a processor to control discharge of the bank of capacitors via the electrode to the surface when the electrode is engaged by the electrode supporting element.

18 Claims, 2 Drawing Sheets

SYSTEM FOR MATERIAL DEPOSITION ON A SURFACE

BACKGROUND

Field

The present disclosure relates to material deposition apparatus and more particularly pertains to a new system for material deposition on a surface to, for example, build up the surface (such as with Harden material) or roughen the texture of the surface.

Description of the Prior Art

Tools that enable the deposition of material, such as metal containing material, on a surface, which may also contain metal, are known. Examples of such technology are disclosed, for example, in U.S. Pat. Nos. 3,524,956; 3,753,343; 3,878,351; 3,969,601; and 4,551,603, the disclosure of each being hereby incorporated by reference in its entirety. In such tools, the material of an electrode carried by a tool is transferred to a surface through the arcing of electrical power between the electrode and the surface which functions to melt a portion of the electrode such that the melted portion of the electrode is transferred to the surface and becomes bonded to the surface upon cooling.

Although the known tools are generally suitable for their particular purposes, the applicant has recognized improvements could be made in such tools.

SUMMARY

In one aspect, the disclosure relates to a system for depositing a metal material of an electrode on a metal surface of a workpiece. The system may comprise a tool unit configured to support the electrode, and the tool unit may include a tool housing, an electrode supporting element configured to support the electrode on the tool housing, and movement structure configured to move the electrode with respect to the housing via the electrode supporting element. The system may also comprise electrical circuitry configured to produce a voltage potential between the electrode and the metal surface. The electrical circuitry may include a power source configured to provide power to elements of the electrical circuitry, and a bank of capacitors configured to be selectively charged by the power source and discharged via an electrode engaged by the electrode supporting element to the metal surface. The power source may comprise a rechargeable battery.

In another aspect, the disclosure relates to a system for depositing a metal material of an electrode on a metal surface of a workpiece. The system may comprise a tool unit configured to support the electrode, and the tool unit may include a tool housing, an electrode supporting element configured to support the electrode on the tool housing, and movement structure configured to move the electrode with respect to the housing via the electrode supporting element. The system may further comprise electrical circuitry configured to produce a voltage potential between the electrode and the metal surface, and the electrical circuitry may include a power source configured to provide power to elements of the electrical circuitry, a bank of capacitors configured to be selectively charged by the power source and discharged via an electrode engaged by the electrode supporting element to the metal surface, and a processor configured to control discharge of the bank of capacitors via the electrode to the metal surface when the electrode is engaged by the electrode supporting element.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of any steps set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
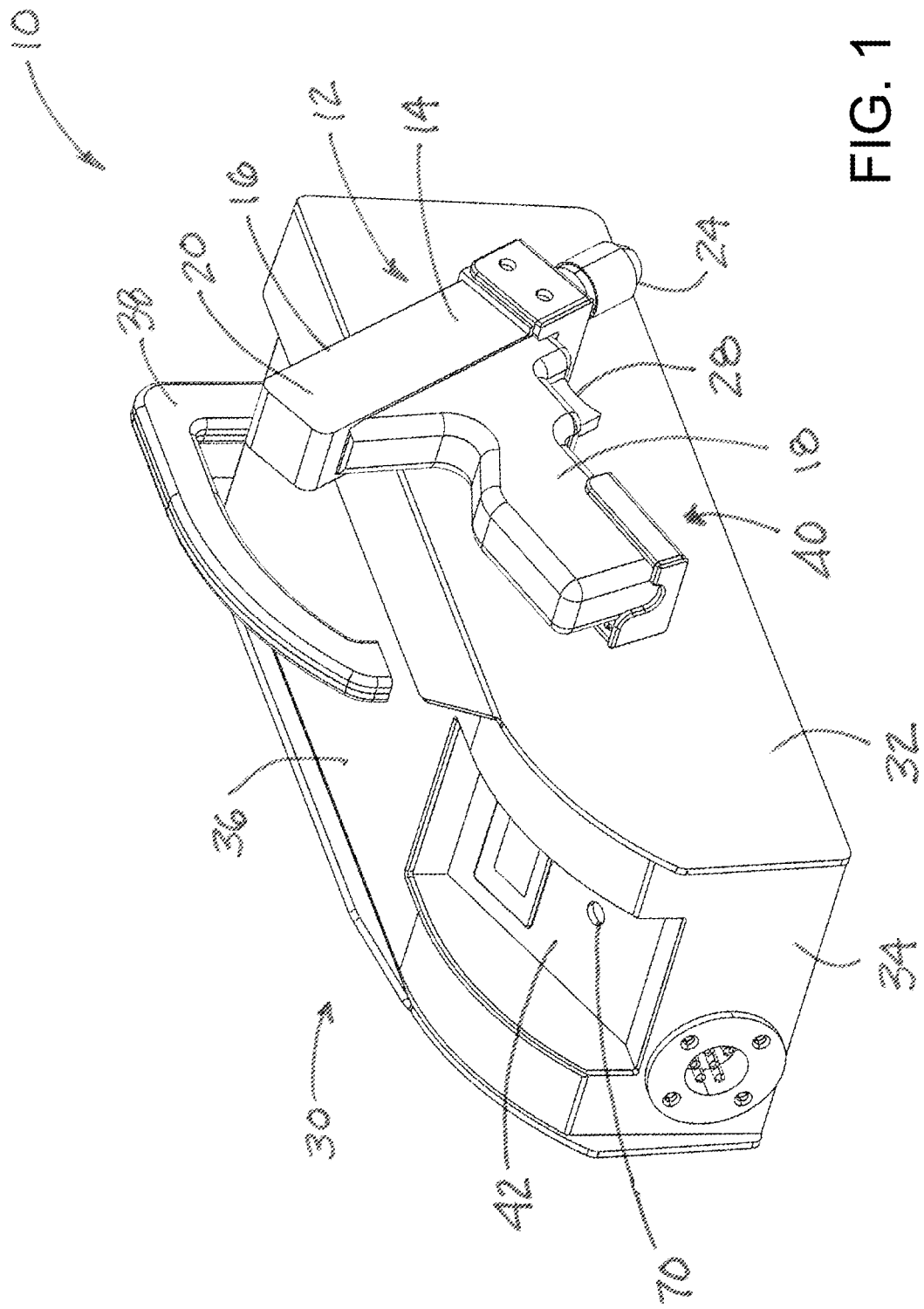
FIG. 1 is a schematic perspective view of a new system for material deposition on a surface according to the present disclosure, with elements such as the connecting member omitted for clarity of depiction.
Figure 2:
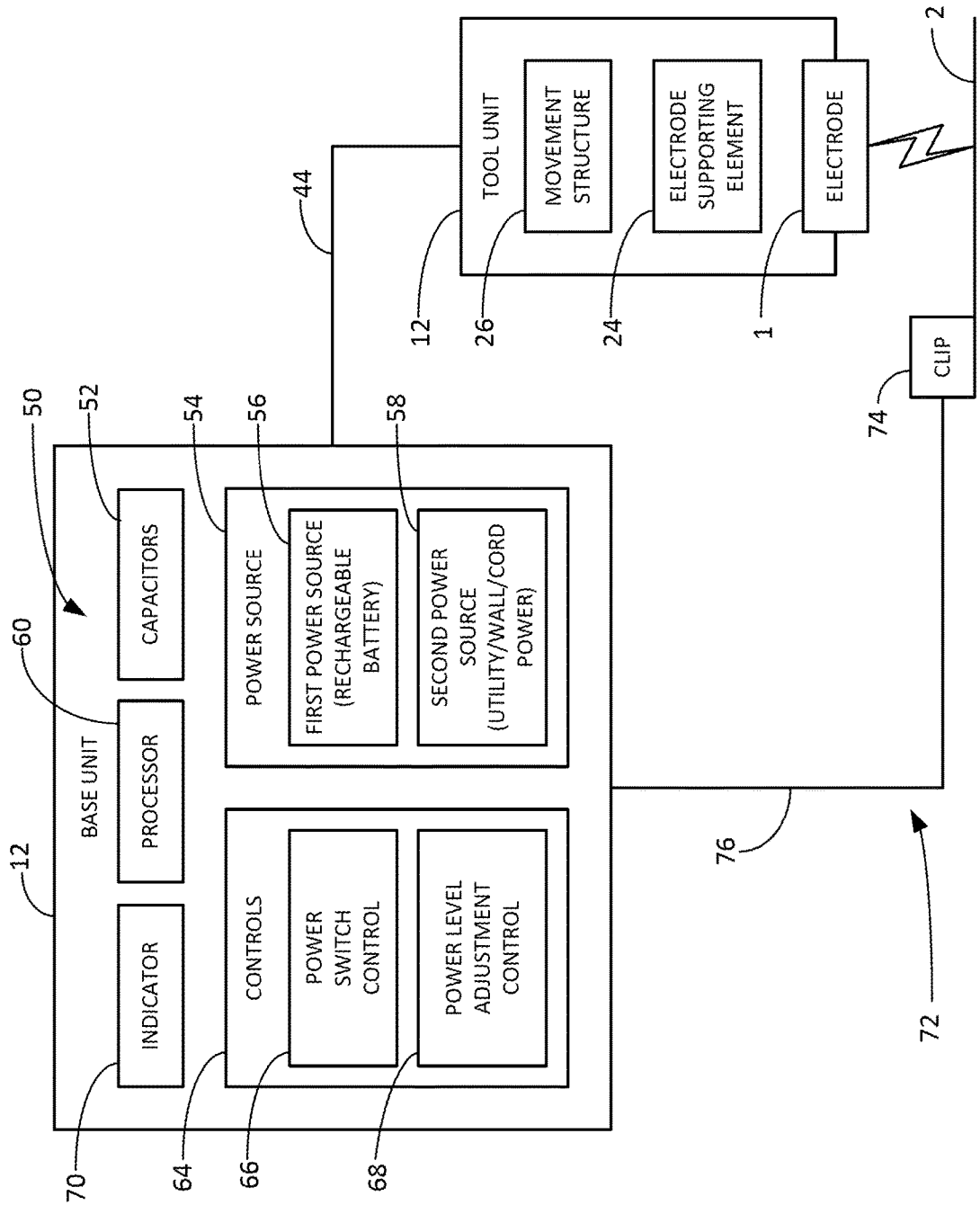
FIG. 2 is a schematic diagram of elements of the new system, according to an illustrative embodiment.

With reference now to the drawings, and in particular to FIGS. 1 and 2 thereof, a new system for material deposition on a surface embodying the principles and concepts of the disclosed subject matter will be described.

The applicant has developed a system in which a microprocessor controls the discharge of the capacitors to the electrode (and thus the resulting arc or spark between the electrode and the workpiece). Advantageously, the utilization of the microprocessor to control the discharge of the capacitors to the electrodes may permit a more controlled capacitor discharge and may permit adjustment of the frequency of the arc in a controlled manner, based upon one or more factors. One such factor may be the relative power level being applied to the electrode. For example, at relatively lower levels of electrical power applied to the electrode, a relatively higher frequency of discharge may be utilized, and at relatively higher levels of electrical power supplied to the electrode, a relatively lower frequency of discharge may be utilized.

In one aspect, the disclosure relates to a system 10 for depositing a metal material of an electrode 1 on a metal surface of a workpiece 2, such as to form a partial or full coating of the material on the surface of the workpiece. It should be recognized that in the context of this description, the "metal material" and "metal surface" is intended to encompass and include materials which may include materials other than metals, and broadly encompass materials and services which are electrically conductive such that an electrical arc may be produced between the metal material of an electrode and the metal surface of the workpiece.

The system 10 may generally include a tool unit 12 configured to support an electrode 1 and a base unit 30 which may be used in conjunction with the tool unit 12 to mount and contain various elements of the system. A connecting member 44 may connect the tool unit 12 to the base unit 30 in a manner such that a degree of independent movement of the tool unit with respect to the base unit is possible. While the incorporation of elements of the system 10 in the two units 12, 30 is believed to provide significant advantages in the maneuverability of the tool unit 12 may be supported by the hand of the user and relatively easily moved about with respect to the workpiece, workpiece while the base unit 30 may remain relatively stationary with respect to the tool unit and be rested, for example, on a surface or support. It will be appreciated that the elements of the system may optionally be incorporated in a single unit, or more than two units.

In greater detail, the tool unit 12 may illustratively include a tool housing 14 which may define a tool interior and have an outer surface 16. In the illustrative embodiment, the outer surface 12 of the tool unit may generally have a gun shape. The tool housing 14 may have a grip portion 18 which has the outer surface of the grip portion being contoured in a manner suitable for being gripped by the hand of the user. The tool housing 14 may also have a barrel portion 20 may extend from the grip portion 18 and may terminate at a tip 22.

The tool unit 12 may also include an electrode supporting element 24 which is configured to support the electrode 1 on the tool housing 14, and a portion of the electrode may be removably inserted into the supporting element 24 prior to operation of the system and may hold the electrode on the housing 14 while the system is being operated and portions of the electrode are being melted and deposited on the surface of the workpiece. The electrode supporting element 24 may be mounted on the tool housing 14 in a manner such that the electrode supported by the supporting element protrudes from the tip 22 of the barrel portion of the tool housing.

The tool unit 12 may further include movement structure 26 configured to move the electrode with respect to the tool housing via the electrode supporting element 24. In some embodiments, the electrode supporting element 24 and movement structure 26 may be configured to vibrate the electrode mounted on the supporting element using, for example, suitable structure known in the art. In some embodiments, the supporting element 24 and movement structure 26 may be configured to rotate the electrode mounted on the supporting element also using, for example, suitable structure known in the art.

Further, the tool unit 12 may include a switch 28 mounted on the tool housing 14, and the switch may be positioned on the housing 14 in a location adjacent to the grip portion 18 such that the hand of the user is able to actuate or press the switch when the user's hand grips the grip portion 18.

The illustrative base unit 30 may include a base housing 32 which may define a base interior for containing various elements associated with the base unit. The base housing 32 may include an enclosing wall 34 having an exterior surface 36, and a handle 38 may be provided to facilitate lifting and transport of the base unit by the user. The handle 38 may be mounted on the enclosing wall 34 and extend from the exterior surface of the enclosing wall to effectively form a loop with the wall 34 into which a portion of the hand of the user may be inserted to lift and carry the base unit. In some embodiments, the base unit 30 may include a tool holster structure 40 which is configured to removably support the tool housing 14 of the tool unit 12 on the base housing 32, and the holster structure 40 may be the tool holster structure may be mounted on the enclosing wall 34 at a suitable location, such as on a side of the wall. The base unit 30 may also have a control panel 42 positioned on the enclosing wall for holding one or more controls or displays.

The connecting member 44 utilized to connect the tool 12 and base 30 units together may include at least one conductor to conduct electrical power from the base unit to the tool unit.

The system 10 may also include electrical circuitry 50 configured to produce a voltage potential between the electrode and the metal surface of the workpiece. In some embodiments, the electrical circuitry 50 may comprise a bank 52 of capacitors configured to be selectively charged by a power source, and discharged, such as via the electrode to the workpiece. The bank of capacitors may include multiple banks of capacitors. The bank of capacitors may be configured in a manner known in the art. It will be recognized that the bank 52 of capacitors may be located in either the tool unit 12 or the base unit 30, although positioning of the bank 52 in the base unit may be particularly advantageous, particularly when multiple banks of capacitors are utilized.

The system 10 may include a power source 54 configured to provide power to elements of the electrical circuitry 50, such as the bank 52 of capacitors, but also other elements of the system, such as the movement structure 26 employed to move the electrode 1. In some embodiments, one or more relays may be provided in the circuitry 52 charge one or more banks of the capacitors. In one significant aspect of the disclosure, the power source 54 may include a rechargeable battery of suitable power characteristics (e.g., amperage and voltage) to provide suitable electrical power to, for example, the bank 52 of capacitors. Typically the power provided by the rechargeable battery is direct current. It should be understood that the rechargeable battery is most suitably of a type capable of multiple charging and discharging cycles over its useful life. The rechargeable battery may be permanently mounted on one of the housings of the units, and the permanent mounting may be characterized by the fact that removal of the battery from the housing may require substantial disassembly of the housing. Most suitably, the rechargeable battery is mounted on the base housing 32 of the base unit.

In another significant aspect of the disclosure, the power source 54 may be a selectable power source in which the source of the power for the electrical circuitry is selectable from more than one type of power source. The selectable power source may permit selection between two distinct power sources, namely a first distinct power source 56 which may comprise the rechargeable battery, and a second distinct power source 58 which may comprise power provided through a power cord connectable to the electrical power typically available via the structural wiring of a building structure and connected to the utility power grid. Such power is typically approximately 120 V or approximately 240 V alternating current. In some implementations, the second distinct power source 58 may be capable of recharging the rechargeable battery of the first distinct power source 56, such as during times when the power cord of the power source 58 is connected to the structural wiring of a building, and such charging may be initiated automatically without user intervention to initiate the charging.

The system 10 may further include a processor 60 which may control aspects of the operation of the electrical circuitry 50, and may also control aspects of the operation of the power source 54 (particularly when the power source includes more than one distinct power source).

In some implementations, the processor 60 may be configured to control discharge of the bank 52 of capacitors via the electrode 1 to the metal surface when the electrode is engaged by the electrode supporting element 24 and the system is operating. More specifically, the processor 60 may be configured or programmed to cause charging of the bank 52 of capacitors with electrical power from the power source 54, and may be configured or programmed to cause or trigger discharging of electrical power from the bank 52 of capacitors when it is detected that the electrode is in contact with, or proximate to, the workpiece.

Advantageously, the processor 60 may be programmed or otherwise configured to control the frequency of arc discharges of electrical power between the electrode and the workpiece, and may be configured to adjust the frequency of arc discharges as a function of a level of electrical power supplied to the electrode from the bank of capacitors. Such control of the frequency of arc discharges may maximize the power output at the current level of electrical power supplied to the electrode. Illustratively, the processor may be configured to increase the frequency of arc discharge of electrical power at relatively lower levels of electrical power, and decrease the frequency of arc discharge of electrical power at relatively higher levels of electrical power.

In some implementations, the processor 60 may be configured to detect or sense the availability of electrical power from the two distinct power sources 56, 58, and select between the power sources based upon, for example, automatic programming or control settings. The electrical circuitry 50 may also include circuitry which detects when the electrode 1 comes into contact with the surface of the workpiece 2, and the detection of contact may signal or trigger the processor 60 to initiate the supply of power to the electrode and arcing or sparking between the electrode and the workpiece.

The system 10 may also include one or more controls 64 which are configured to control at least one aspect of operation of the system. In some embodiments, the controls 64 may include a power switch control 66 that is configured to selectively connect and disconnect the power source 54 to the bank of capacitors for charging the capacitors. The power switch control 66 may be located on the tool unit 12, and the control 66 may be located on the switch 28 of the tool housing such that manipulation of the switch 28 causes actuation of the switch control 66. In embodiments, the controls 64 may include a power level adjustment control 68 which is configured to adjust the level of electrical power that is supplied to the electrode via, for example, the bank 52 of capacitors. Illustratively, the power level adjustment control 68 may be located on the base unit 30, and may be located on the control panel 42 of the base unit.

The system 10 may further include at least one indicator 70 that is configured to indicate a status characteristic of the system 10, and may comprise a power indicator configured to indicate the availability of power to the system 10, or at least the electrical circuitry of the system 10. The system may also have a grounding structure 72 to facilitate the creation of an electrical loop by the electrical circuitry, and the structure 72 may be attachable to the workpiece. Illustratively, the grounding structure may comprise a clip 74 that is removably attachable to the workpiece, and a tether member 76 which is electrically connected to the clip 74 and is connectable to the electrical circuitry to produce the electrical loop.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A system for depositing a metal material of an electrode on a metal surface of a workpiece, the system comprising:
    a tool unit configured to support the electrode, the tool unit including:
        a tool housing;
        an electrode supporting element configured to support the electrode on the tool housing; and
        movement structure configured to move the electrode with respect to the housing via the electrode supporting element;
    electrical circuitry configured to produce a voltage potential between the electrode and the metal surface, the electrical circuitry including:
        a power source configured to provide power to elements of the electrical circuitry;
        a bank of capacitors configured to be selectively charged by the power source and discharged via an electrode engaged by the electrode supporting element to the metal surface;

wherein the power source comprises a rechargeable battery; and wherein the electrical circuitry additionally comprises a processor configured to control a frequency of arc discharges of electrical power between the electrode and the workpiece as a function of a level of electrical power supplied to the electrode from the bank of capacitors.

2. The system of claim 1 wherein the power source comprises a selectable power source, the selectable power source permitting selection between two distinct power sources.

3. The system of claim 2 wherein the two distinct power sources include a first distinct power source and a second distinct power source, the first distinct power source comprising the rechargeable battery and the second distinct power source comprising a power cord connectable to structural wiring of a building to draw alternating current.

4. The system of claim 3 wherein the second distinct power source is capable of recharging the rechargeable battery of the first distinct power source.

5. The system of claim 4 wherein the second distinct power source is configured to automatically provide electrical power to the rechargeable battery when electrical power is available to the second distinct power source.

6. The system of claim 5 wherein the electrical circuitry additionally comprises a processor configured to detect availability of electrical power from the two distinct power sources, and cause the rechargeable battery of the first distinct power source to be recharged by the second distinct power source when the second distinct power source has electrical power.

7. The system of claim 1 wherein the rechargeable battery being permanently mounted on one said housing, the rechargeable battery being mounted on an element of the system.

8. The system of claim 1 wherein the electrical circuitry additionally comprises:

a processor configured to control discharge of the bank of capacitors via an electrode to the metal surface when the electrode is engaged by the electrode supporting element.

9. A system for depositing a metal material of an electrode on a metal surface of a workpiece, the system comprising:

a tool unit configured to support the electrode, the tool unit including:

a tool housing;

an electrode supporting element configured to support the electrode on the tool housing; and movement structure configured to move the electrode with respect to the housing via the electrode supporting element;

electrical circuitry configured to produce a voltage potential between the electrode and the metal surface, the electrical circuitry including:

a power source configured to provide power to elements of the electrical circuitry;

a bank of capacitors configured to be selectively charged by the power source and discharged via an electrode engaged by the electrode supporting element to the metal surface;

wherein the power source comprises a rechargeable battery;

wherein the rechargeable battery is permanently mounted on one said housing, the rechargeable battery being mounted on an element of the system; and a base unit separate of the tool unit and having a base housing, the rechargeable battery being permanently mounted on the base housing.

10. The system of claim 9 wherein the electrical circuitry additionally comprises a processor configured to control a frequency of arc discharges of electrical power between the electrode and the workpiece as a function of a level of electrical power supplied to the electrode from the bank of capacitors.

11. A system for depositing a metal material of an electrode on a metal surface of a workpiece, the system comprising:

a tool unit configured to support the electrode, the tool unit including:

a tool housing;

an electrode supporting element configured to support the electrode on the tool housing; and movement structure configured to move the electrode with respect to the housing via the electrode supporting element;

electrical circuitry configured to produce a voltage potential between the electrode and the metal surface, the electrical circuitry comprising:

a power source configured to provide power to elements of the electrical circuitry;

a bank of capacitors configured to be selectively charged by the power source and discharged via an electrode engaged by the electrode supporting element to the metal surface; and a processor configured to control discharge of the bank of capacitors via the electrode to the metal surface when the electrode is engaged by the electrode supporting element;

wherein the processor is configured to increase the frequency of arc discharge of electrical power at relatively lower levels of electrical power and decrease the frequency of arc discharge of electrical power at relatively higher levels of electrical power.

12. The system of claim 11 wherein the power source comprises a selectable power source, the processor being configured to selection between two distinct power sources.

13. The system of claim 12 wherein the two distinct power sources includes a first distinct power source and a second distinct power source, the first distinct power source comprising a rechargeable battery and the second distinct power source comprising a power cord connectable to structural wiring of a building to draw alternating current.

14. The system of claim 13 wherein the processor is configured to detect availability of electrical power from the two distinct power sources, and cause the rechargeable battery of the first distinct power source to be recharged by the second distinct power source when the second distinct power source has electrical power.

15. The system of claim 13 additionally comprising at least one control configured to control at least one aspect of operation of the system.

16. The system of claim 15 wherein the at least one control comprises a power level adjustment control configured to adjust the level of electrical power supplied to the electrode.

17. A system for depositing a metal material of an electrode on a metal surface of a workpiece, the system comprising:

a tool unit configured to support the electrode, the tool unit including:
a tool housing;
an electrode supporting element configured to support the electrode on the tool housing; and
movement structure configured to move the electrode with respect to the housing via the electrode supporting element;
electrical circuitry configured to produce a voltage potential between the electrode and the metal surface, the electrical circuitry comprising:
a power source configured to provide power to elements of the electrical circuitry;
a bank of capacitors configured to be selectively charged by the power source and discharged via an electrode engaged by the electrode supporting element to the metal surface; and
a processor configured to control discharge of the bank of capacitors via the electrode to the metal surface when the electrode is engaged by the electrode supporting element;
a base unit configured for resting upon a surface independent of the tool unit, the power source and the processor being located on the base unit.

18. The system of claim 17 wherein the processor is configured to increase the frequency of arc discharge of electrical power at relatively lower levels of electrical power and decrease the frequency of arc discharge of electrical power at relatively higher levels of electrical power.

\* \* \* \* \*